May 30, 1950 R. E. JENKINS 2,509,437
MOWING MACHINE
Filed Sept. 4, 1944
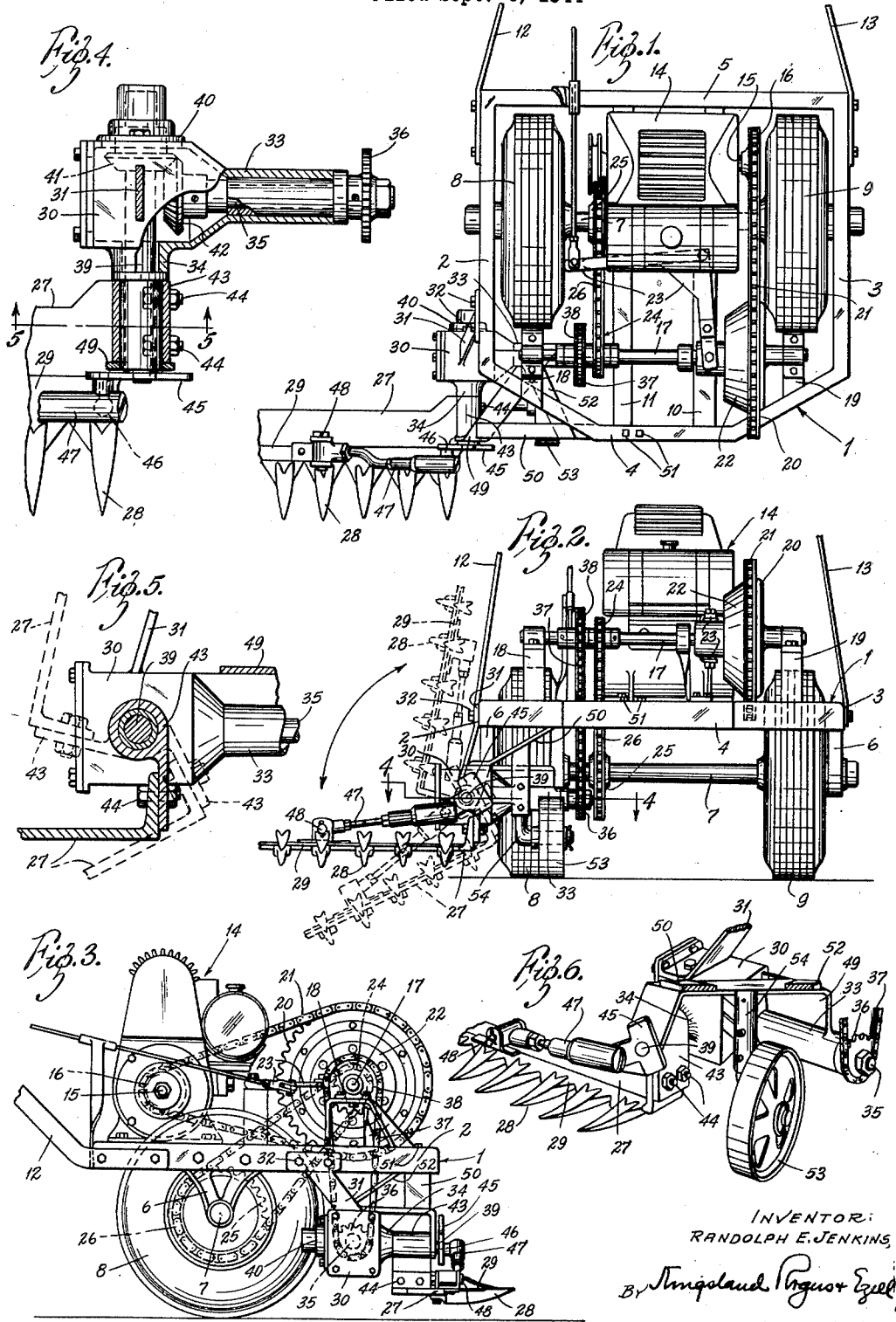
INVENTOR:
RANDOLPH E. JENKINS
BY Ringoland, Rogust Ezell
ATTORNEYS.

Patented May 30, 1950

2,509,437

UNITED STATES PATENT OFFICE 2,509,437

MOWING MACHINE

Randolph E. Jenkins, St. Louis, Mo.

Application September 4, 1944, Serial No. 552,587

7 Claims. (Cl. 56—26.5)

This invention relates to wheeled machines, and more particularly to a mowing machine having a reciprocating sickle.

One of the objects of the invention is to produce an improved driving means for a reciprocating sickle of a mower.

Another object of the invention is to provide such a driving means for a sickle of a mower that the sickle can be driven in any angular position of the sickle bar.

A further object is to produce an improved power transmitting arrangement for driving the wheels and sickle of a motor driven mower.

A further object is to produce an improved power driven wheeled machine.

Other objects of the invention will become apparent from the following description taken in connection with the accompanying drawings showing a motor driven mower embodying the invention.

In the drawings:

Fig. 1 is a top view of the mower;

Fig. 2 is a front view of the mower;

Fig. 3 is a side view of the mower;

Fig. 4 is a view partly in section showing the mounting means for the sickle bar and the sickle driving means, said view being taken approximately on the line 4—4 of Fig. 2;

Fig. 5 is a sectional view taken on the line 5—5 of Fig. 4; and

Fig. 6 is a perspective view of the sickle bar mounting and the sickle driving means at the end of the mounted end of the sickle bar.

Referring to the drawings in detail, the mowing machine disclosed comprises a frame of a general rectangular shape indicated by the numeral 1 and having side portions 2 and 3 and front and back portions 4 and 5. Journaled on the side portions by means of hangers 6 is an axle 7 to which are secured spaced wheels 8 and 9. These wheels are arranged to be within the outlines of the frame but positioned closely to the side portions. The frame also has two longitudinal bars 10 and 11 which are secured, as by welding, to the front and back portions of the frame. The frame has secured thereto rearwardly extending portions 12 and 13 which are arranged to have at their ends handles (not shown) whereby the mower can be guided by the operator.

The two bars 10 and 11 support a motor, shown as an internal combustion engine 14, having a driving shaft 15 to which is secured a sprocket wheel 16. Forwardly of the engine is an intermediate power transmitting shaft 17 parallel with the engine shaft, this shaft being journaled on its ends on supports 18 and 19 welded or otherwise secured to the front portion of the frame. Rotatably mounted upon this shaft is a large sprocket wheel 20 which is driven by a chain 21 from the sprocket wheel 16 on the end of the motor shaft. The sizes of the sprockets are such that there will be a reduced speed drive between the motor shaft and the intermediate shaft. Associated with the large sprocket wheel 20 is a clutch 22 for connecting this sprocket wheel to the intermediate shaft. The clutch can be engaged and disengaged by a suitable operating mechanism, generally referred to by the numeral 23, which has an operator controlled rod extending up to one of the handles for the mower.

The intermediate shaft is not only parallel with the engine shaft but is also parallel with the axis 7 and is arranged to drive this axle and the wheels to thus move the mower. The driving connection comprises a sprocket wheel 24 secured to the intermediate shaft, a larger sprocket wheel 25 secured to the axle, and a connecting chain 26.

The mowing machine is provided with a sickle bar 27 which extends laterally from one corner of the frame and is supported from the frame. The sickle bar is provided with guards 28 and has the usual reciprocable sickle 29. The sickle is arranged to be driven from the intermediate shaft. The mounting means for the sickle and the driving connection to the sickle bar comprise a structure which is best shown in Figs. 4, 5 and 6.

A gear box 30 is provided with an upwardly extending hanger arm 31 which is connected by bolts 32 to the side portion 2 of the mower frame. This gear box has extensions 33 and 34 at right angles to each other, the extension 33 being arranged to extend parallel with and below the intermediate power transmitting shaft 17. Journaled in this extension is a shaft 35 which has secured to its outer end a sprocket wheel 36, said sprocket wheel being connected to be driven from the intermediate shaft by means of a chain 37 and a sprocket wheel 38 secured to the intermediate shaft. The other extension 34 of the gear box has journaled therein a sickle driving shaft 39 which extends completely through the gear box and has its rear end journaled in a closure plate 40 of the gear box. This shaft is arranged to be driven by the shaft 35, the driving connection comprising beveled gears 41 and 42.

Extension 34 not only serves as a journal means for the shaft 39 but also is arranged to provide a pivotal mounting for a sickle bar hanger 43 to which is attached, as by bolts 44, the inner end of the previously mentioned sickle bar 27. By this mounting arrangement for the sickle bar, the sickle bar can swing only around the axis of the sickle driving shaft 39.

The outer end of the sickle driving shaft 39 has secured thereto a crank arm 45, said crank arm carrying a crank pin 46 provided with a ball end. To this ball end of the crank pin is connected one end of a pitman rod 47, the other end of said pitman rod being pivotally connected to a cross pin 48 carried by the inner end of the sickle 29. The crank and pitman arrangement provides a connection between the sickle driving shaft 39 and the sickle whereby the rotary movement of the driving shaft 39 can be transferred into a reciprocating movement of the sickle.

Since the sickle bar is pivotally mounted on the gear box and the sickle bar is subject to many strains and stresses, it is necessary that these stresses be properly transferred to the frame of the mowing machine without the possibility of twisting the gear box and causing the shaft 35 to become out of parallelism with the intermediate shaft 7. Thus to strengthen the mounting of the gear box, there is provided a supporting member 49 which has one end secured, as by welding, to the extension 33 of the gear box and its other end arranged to have a bearing for the outer end of the sickle driving shaft between the extension 34 and the crank arm 45. Extending from this supporting member is an attaching arm 50 having one end attached, as by welding, to the supporting member and the other end arranged to be connected, as by bolts 51, with the forward portion 4 of the frame. A brace 52 extends between this arm and the supporting member adjacent to where the said member is connected to the extension 33 of the gear box. The entire mounting means for the sickle bar and the driving means for the sickle are such that they may be readily removed from the frame of the mower by merely unbolting the gear box hanger 31 and the attaching arm 50. The mounting arrangement, however, insures plenty of strength to efficiently transfer all the strains and stresses from the sickle bar to the mower frame.

In order to maintain the inner end of the sickle bar at a proper height from the ground, there is provided a wheel 53 rotatably mounted on a strut 54 which strut is secured to the gear box and other sickle bar mounting means. The strut is adjustable to vary the height of the sickle bar.

*Operation*

From the above described structure of this mowing machine, the operation thereof appears to be obvious. It is seen that the intermediate power transmitting shaft is driven by the engine whenever the clutch 22 is engaged. This intermediate shaft, in turn, will drive the axle and also cause reciprocation of the sickle to bring about the mowing operation. Whenever the clutch 22 is disengaged, neither the wheels nor the sickle will be driven.

The arrangement of the wheels and the mounting of the intermediate shaft and the motor on the frame insure a very compact and conveniently accessible construction. By having the wheels spaced fairly close together, the mowing machine is easily handled and can be guided to make very short turns. By the particular mounting of the sickle bar and the driving means for the sickle, it is especially noted that the arrangement is such that the sickle can be driven in any angular position the sickle bar may assume. This is well illustrated in Fig. 2 wherein the sickle bar is shown in various angular positions. Since the axis of the pivotal mounting of the sickle bar coincides with the axis of the driving shaft for the sickle, the relationship between the driving shaft crank arm, the pitman and the sickle bar never changes for any position to which the sickle bar can be swung. This is very important since it permits the mower to be used in cutting all types of terrain. If it is desired to cut the sides of ditches from the top of the ditch, the sickle bar will follow the side of the ditch and perform efficient cutting in the same manner it would on flat ground. Sloping terraces can also be cut easily when the mower is run across the top of the terrace. Terraces can also be cut by running the mower along the bottom of the terrace, since the sickle will operate efficiently when the sickle bar extends upwardly at an angle from the mowing machine. It is also possible to drive the sickle when the sickle bar is in a vertical position. This results in additional uses for the mower since it can be used, as for example, to trim the sides of hedges.

Being aware of possible modifications in the mechanism described, it is not desired that the invention be limited except as set forth in the claims.

What is claimed is:

1. In a power mowing machine, a frame comprising side and end portions, an axle journaled on the side portions, wheels on the axle in spaced relation, a motor mounted on the frame between the wheels, a sickle driving shaft, means fixed on the frame for supporting said shaft below the frame, a sickle bar, bearing means rockably mounting one end of the sickle bar on a fixed portion of the shaft supporting means, the bearing means being substantially concentric with the shaft to swing about an axis coinciding with the axis of the shaft, said bar extending at right angles to the axis of the sickle driving shaft and said shaft being positioned at right angles to the axle, a sickle reciprocably mounted on the bar, a connection between the sickle and sickle driving shaft capable of converting rotary movement into reciprocating movement, means for driving said shaft by the motor, and means for driving the axle by the motor.

2. In a power mowing machine, a frame, an axle journaled on the frame, wheels on the axle in spaced relation, a motor mounted on the frame having a shaft parallel with the axle, a power transmitting shaft journaled on the frame forwardly of the axle and positioned parallel with the axle, means for driving the last named shaft from the motor shaft, means for driving the axle from the power transmitting shaft, a sickle driving shaft, means fixed on the frame for supporting said shaft below the frame and forwardly of the axle, a sickle bar, bearing means rockably mounting one end of the sickle bar on a fixed portion of the supporting means, the bearing means being substantially concentric with the shaft to swing about an axis coinciding with the axis of the sickle driving shaft, said bar extending at right angles to the axis of the sickle driving shaft and said shaft being positioned at right angles to the axle, a sickle reciprocable on the bar, a connection between the sickle and the sickle driving shaft for converting rotary movement into reciprocating movement, an intermediate driving shaft journaled at right angles to the sickle shaft and geared thereto, and means for driving the intermediate shaft from the power transmitting shaft.

3. In a mowing machine, a frame; a housing depending from said frame; a sickle driving shaft rotatably mounted in the housing, said shaft containing a bevel gear adjacent one end thereof; an intermediate shaft rotatably mounted in the housing normal to the sickle driving shaft, said intermediate shaft containing a bevel gear adjacent one end thereof in driving engagement with the gear on the sickle driving shaft; an annular member pivotally mounted on the housing about the other end of the sickle driving shaft, the axis of the annular member coinciding with the axis of the shaft; a sickle bar fastened to said annular member; a sickle mounted on the bar for reciprocating movement; and means connecting the sickle with the sickle driving shaft for reciprocating the sickle when the shaft is rotated.

4. In a mowing machine; a frame, means to support the frame for travel along the ground; an elongated sickle bar and a sickle thereon, and means for supporting the sickle bar on the frame, comprising a housing fixedly mounted on the frame, bearing means on the outside of the housing having its axis transverse to the sickle bar, a bracket having bearing means mounted on said first named bearing means for angular movement about the said axis and for support on the housing, the sickle bar being secured to the bracket for support thereby, whereby the sickle bar may rock about said axis, with the bracket; a driving shaft rotatably mounted in the housing concentrically with the bearing means; and driving connections between the driving shaft and the sickle to reciprocate the sickle, said driving means being operative during the angular movement of the sickle bar.

5. In a mowing machine; a frame, means for supporting the frame for travel along the ground; an elongated sickle bar and a sickle thereon, means providing a circular bearing fixed at least substantially immovably to the frame and supported thereby, the bearing having its axis transverse to the sickle bar, means providing a complementary bearing means on the sickle bar, mounted on the first named bearing means, whereby the sickle bar is supported on the frame for angular movements relatively thereto, and impacts upon the sickle bar are withstood by the frame; a drive shaft supported on the frame concentrically with said bearings, and driving means between the shaft and the sickle to reciprocate the sickle on the sickle bar, said driving means being operable during angular movements of the sickle bar as aforesaid.

6. In a mowing machine; a frame, means for supporting the frame for travel along the ground; an elongated sickle bar and a sickle thereon, means providing a circular bearing fixed at least substantially immovably to the frame and supported thereby, the bearing having its axis transverse to the sickle bar, means providing a complementary bearing means on the sickle bar, mounted on the first named bearing means, whereby the sickle bar is supported on the frame for angular movements relatively thereto, and impacts upon the sickle bar are withstood by the frame; a drive shaft supported on the frame concentrically with said bearings, and driving means between the shaft and the sickle to reciprocate the sickle on the sickle bar, said driving means being operable during angular movements of the sickle bar as aforesaid, and comprising a crank on the shaft, and a pitman arm connected at one end to the crank and at the other end to the sickle at the end of the sickle adjacent the frame.

7. In a mowing machine, a frame, means supporting the frame for forward travel along the ground; a housing depending from the frame, bracing means between the housing and the frame to hold the depending housing rigidly against backward and lateral forces applied thereto tending to move the housing relatively to the frame; a cylindrical bearing on the outside of the housing, with its axis disposed fore-and-aft of the frame; a sickle bar having a sickle movably mounted thereon; a sleeve fixedly attached to the sickle bar, and in turn mounted over the cylindrical bearing to support the sickle bar for angular movements relatively to the housing, the sickle bar extending in a direction transverse to the frame, a driving shaft in the housing concentric with the bearing, means mounted on the frame for rotating the shaft, and means connecting the shaft and the sickle for reciprocation of the sickle by rotation of the shaft.

RANDOLPH E. JENKINS.

REFERENCES CITED

The following references are of record in the file of this patent:

UNITED STATES PATENTS

| Number | Name | Date |
| --- | --- | --- |
| 1,459,998 | Simmons | June 26, 1923 |
| 1,892,620 | Lancaster | Dec. 27, 1932 |
| 2,063,168 | Kinkead | Dec. 8, 1936 |
| 2,166,450 | Smalley | July 18, 1939 |
| 2,237,521 | Frazier | Apr. 8, 1941 |
| 2,263,082 | Fulton | Nov. 18, 1941 |